(No Model.)

C. C. FIELD.
WAGON SEAT.

No. 503,411. Patented Aug. 15, 1893.

WITNESSES:
Chas. Nida.
C. Sedgwick

INVENTOR
C. C. Field
BY
Munn & Co.
ATTORNEYS.

United States Patent Office.

CHARLES C. FIELD, OF NEW YORK, N. Y.

WAGON-SEAT.

SPECIFICATION forming part of Letters Patent No. 503,411, dated August 15, 1893.

Application filed May 2, 1893. Serial No. 472,748. (No model.)

*To all whom it may concern:*

Be it known that I, CHARLES C. FIELD, of the city, county, and State of New York, have invented a new and Improved Wagon-Seat Support, of which the following is a full, clear, and exact description.

The object of the invention is to provide a new and improved seat support, which is simple and durable in construction, and more especially designed for use on city trucks, to permit the driver to conveniently swing the seat over when not in use.

The invention consists of sockets secured to the supporting posts held on the truck floor, each of the sockets being formed with an integral rest, and a bar hinged on each socket and fastened to the seat proper, the said bar being adapted to engage the said rest.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
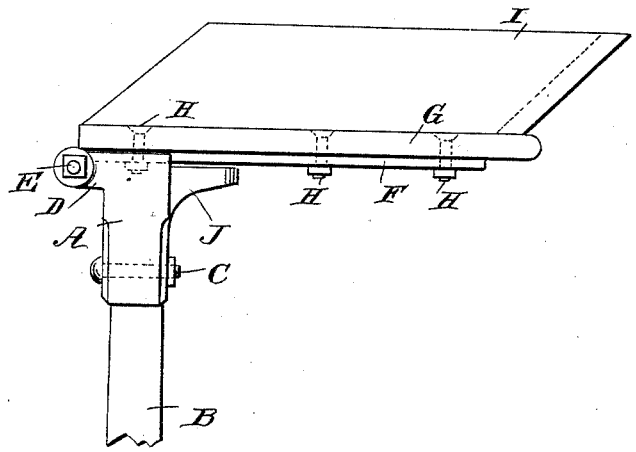
Figures 2, 3:
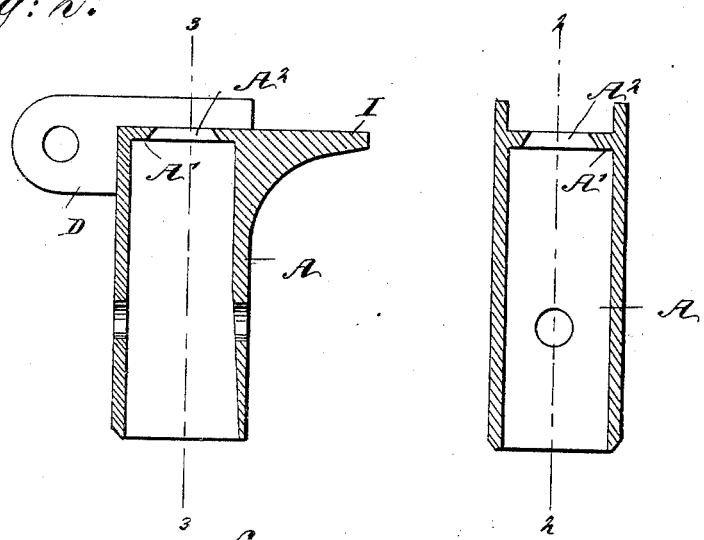
Figure 4:
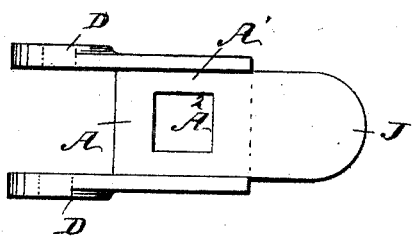

Figure 1 is a side elevation of the improvement as applied. Fig. 2 is an enlarged sectional side elevation of the improvement on line 2—2 of Fig. 3. Fig. 3 is a cross section of the same on the line 3—3 of Fig. 2; and Fig. 4 is a plan view of the same.

The improved wagon seat support is provided with two or more sockets A, each secured on the upper end of a post B, supported on the floor of the truck or wagon in the usual manner, at the front end thereof. The socket A is preferably secured on the upper end of the post B by a bolt C, the closed top A' of the socket A, resting on top of the post. On each of the sockets A and at the front thereof are formed the lugs D, supporting a bolt E, forming the pivot for the eye of a bar F, adapted to be fastened by bolts H, or other suitable means to the bottom board G, of the seat I, as plainly shown in Fig. 1. Each of the bars F for the corresponding socket A is adapted to rest on the top of a seat rest J, projecting from the rear face of the socket A and formed integral therewith, as plainly illustrated in the drawings. By this arrangement, considerable of the strain on the bolt E is taken off at the time the seat I is occupied by the driver or other person. The bolt H near the pivot end of the bar F is adapted to engage with its nut an opening $A^2$ formed in the top A' of the socket A, so that the bar F can rest firmly on the top of the socket and the rest J, as will be readily understood by reference to Fig. 2. The sides of the lugs D extend a short distance above the top of the socket A, so as to form parallel guides for the opposite sides of the bar F at the time the seat is in the proper position. Now, it will be seen that by this arrangement, the sockets A can be readily attached to the upper ends of the posts B, without weakening the same to any appreciable extent, and at the same time the seat I can be readily swung forward to fold against the front sides of the posts B, when the seat is not to be used, so that it will allow more room for storing merchandise in the truck.

Having thus fully described my invention, I claim as new and desire to secure by Letters Patent—

1. In a wagon seat support the tubular socket A, provided at opposite sides of its upper end with forwardly projecting lugs D, the upper edges of which also project above the top of the socket to form guide ways, and the rearwardly extending rest I on the upper end of the socket; the whole being formed in a single piece, substantially as set forth.

2. The combination with the tubular socket adapted to receive the upper end of a post and provided at its upper end with forwardly projecting apertured lugs and a rearwardly extending rest; the whole formed in a single piece, of the seat bar hinged between the said lugs and extending rearwardly across the top of the socket and rest, substantially as set forth.

3. The combination with the tubular socket having a pair of parallel apertured lugs projecting forwardly and upwardly from its upper end and forming hinge knuckles and guides, and the integral rearwardly projecting rest, of the seat bar hinged to the said knuckles and extending rearwardly between the guides and across the said rest, substantially as set forth.

CHARLES C. FIELD.

Witnesses:
THEO. G. HOSTER,
C. SEDGWICK.